April 1, 1924.
A. F. LEWIS ET AL
1,488,644
BLOCK MOLDING APPARATUS
Filed March 17, 1922      5 Sheets-Sheet 3
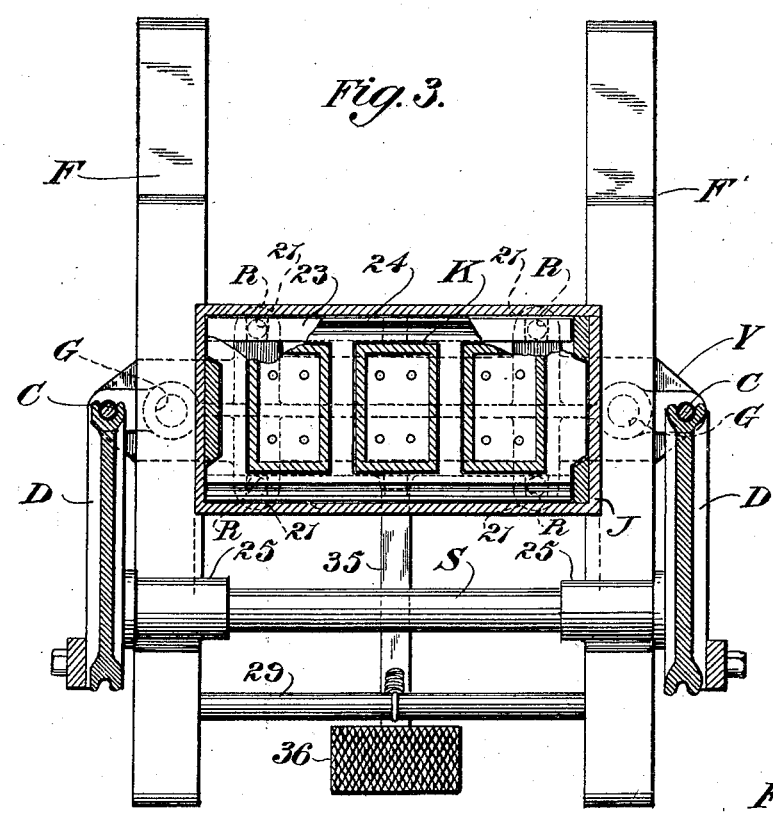
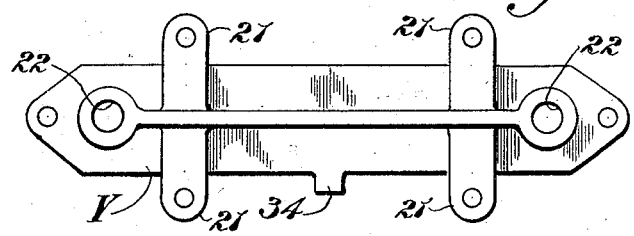
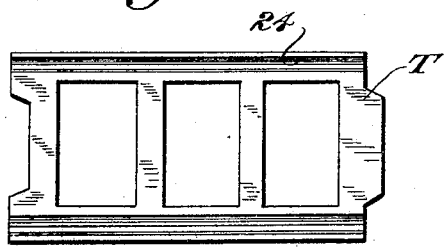

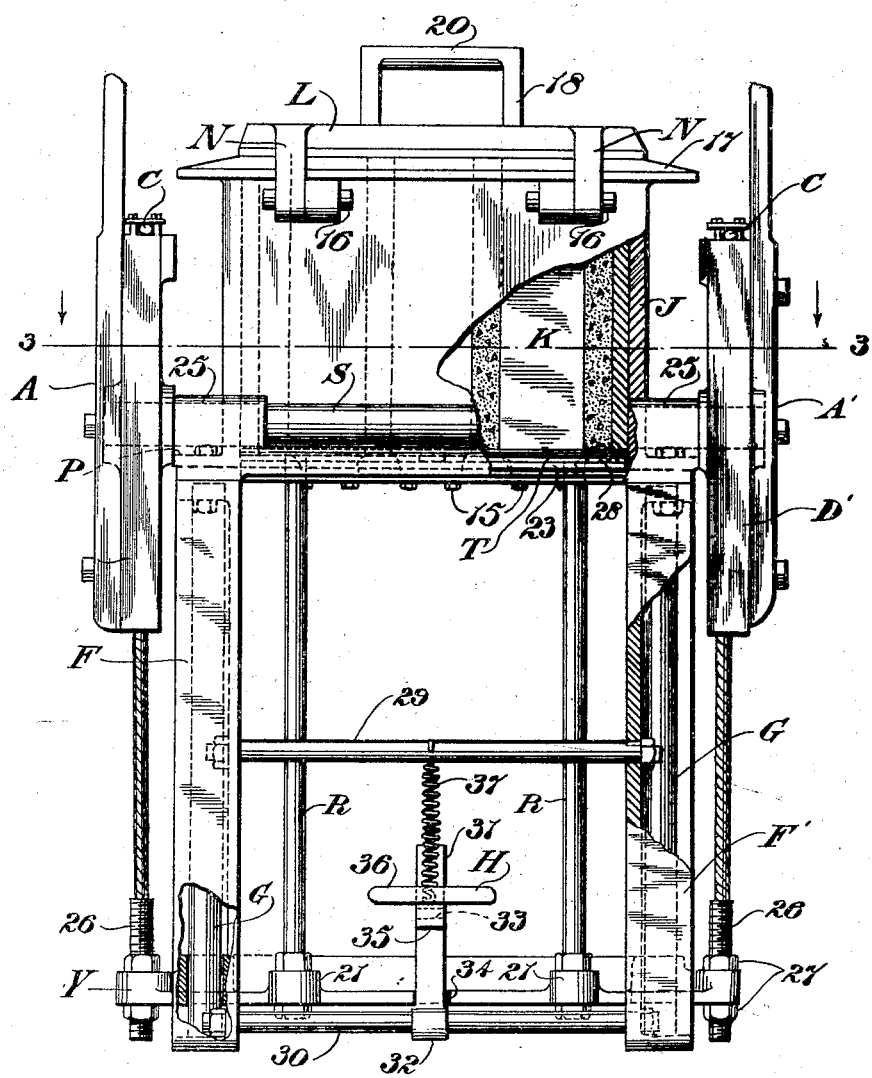

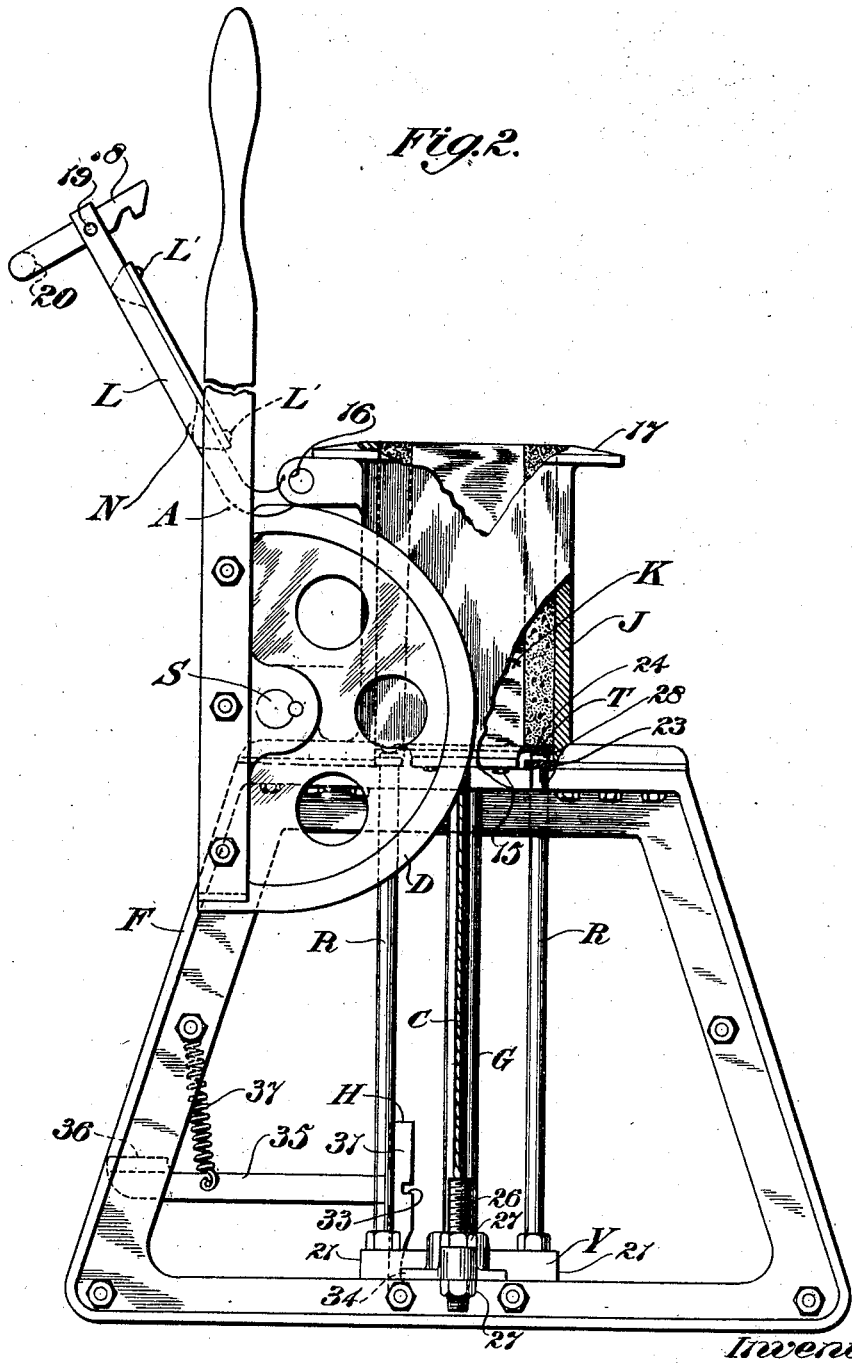

April 1, 1924.

A. F. LEWIS ET AL 1,488,644

BLOCK MOLDING APPARATUS

Filed March 17, 1922    5 Sheets-Sheet 4

Inventors:
A.F.Lewis and
A.G.Balgam.
by Hazard & Miller Attys.

April 1, 1924.

A. F. LEWIS ET AL

BLOCK MOLDING APPARATUS

Filed March 17, 1922    5 Sheets-Sheet 5

Inventors:
A. F. Lewis
A. G. Balcam.
by Hazard & Miller
Attys.

Patented Apr. 1, 1924.

1,488,644

UNITED STATES PATENT OFFICE.

ANSON F. LEWIS AND ARTHUR G. BALAAM, OF SANTA BARBARA, CALIFORNIA.

BLOCK-MOLDING APPARATUS.

Application filed March 17, 1922. Serial No. 544,481.

*To all whom it may concern:*

Be it known that we, ANSON F. LEWIS and ARTHUR G. BALAAM, citizens of the United States, residing at Santa Barbara, in the county of Santa Barbara and State of California, have invented new and useful Improvements in Block-Molding Apparatus, of which the following is a specification.

Our invention relates to apparatus for molding hollow plastic blocks, and a purpose of our invention is the provision of an apparatus of this character which utilizes the weight of the plastic material in effecting the required degree of packing thereof and without the necessity of tamping to form with facility and dispatch a hollow plastic block.

It is also a purpose of our invention to provide a block molding apparatus of extremely simple, durable and efficient construction, and one in which the cores are removably associated with the apparatus to allow of the formation of blocks of different sizes.

Although we will describe only one form of block molding apparatus embodying our invention and point out the novel features thereof in claims, it is to be understood that various changes and modifications may be made herein without departing from the spirit and scope of such claims.

In the accompanying drawings,

Figure 1 is a view showing in front elevation one form of block molding apparatus embodying our invention, with portions thereof broken away to reveal parts not otherwise disclosed.

Fig. 2 is a view showing the molding apparatus in end elevation with portions thereof broken away.

Fig. 3 is a transverse sectional view taken on the line 3—3 of Fig. 1.

Fig. 4 is a detail plan view of the connecting yoke comprised in the apparatus shown in the preceding views.

Fig. 5 is a plan view of the follower or movable bottom comprised in the apparatus shown in the preceding views.

Similar reference characters refer to similar parts in each of the several views.

Figure 6:
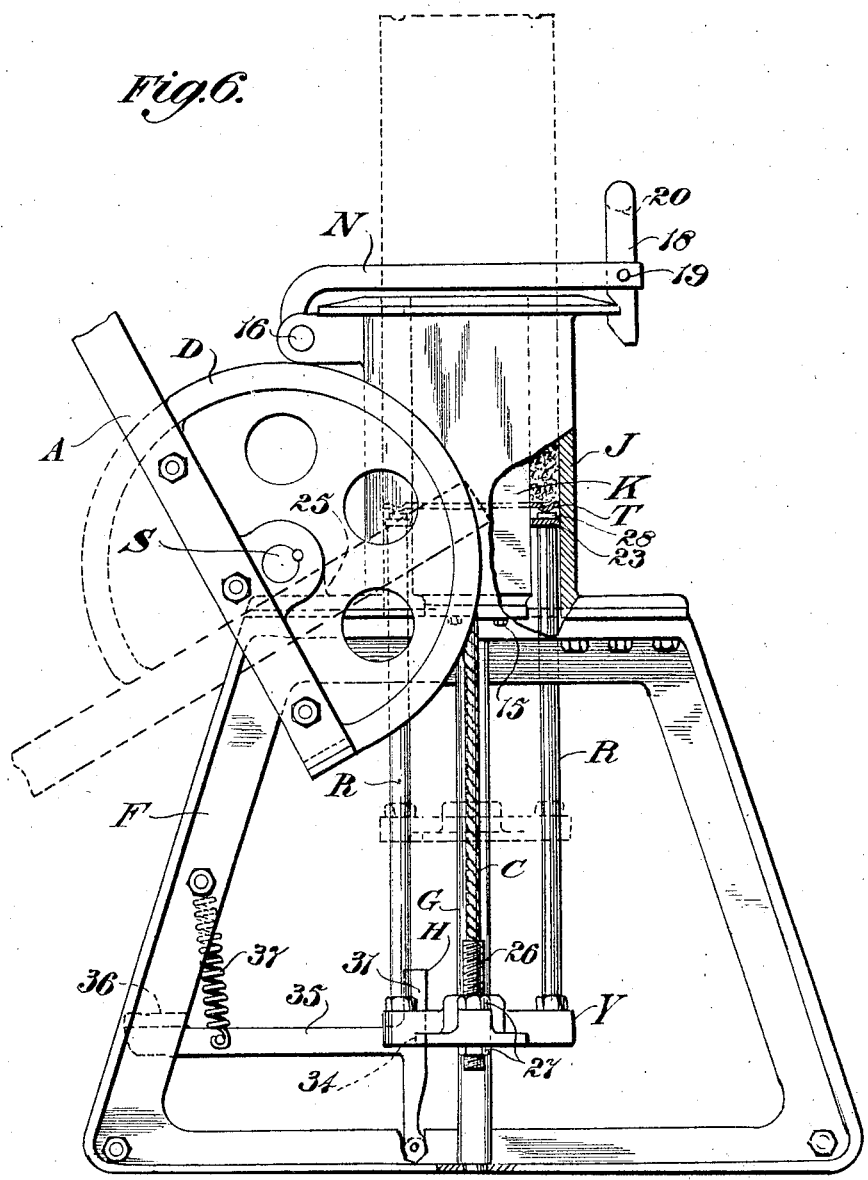
Fig. 6 is a view similar to Fig. 2 with the plunger or packing mechanism in the intermediate position, the upper extreme position being shown in dash lines.

Referring specifically to the drawings, our invention, in its present embodiment, comprises a pair of skeleton frames F and F'. Bolted or otherwise secured to the frames is a jacket J of a block mold such jacket in the present instance being shown of rectangular formation as clearly illustrated in Fig. 3. Within the jacket J is removably secured as by the bolts 15 a plurality of cores K, and these cores are of rectangular form with their upper and lower ends closed. As shown in Fig. 2, each core is tapered from its lower end upwardly so that when in applied position within the jacket they form tapered spaces between the sides of the jacket and the cores. As shown in Fig. 3, the cores are arranged in spaced parallelism with respect to each other and with respect to the end walls of the jacket thereby providing the necessary spaces for the reception of the plastic material to form a hollow block connected at intervals by transverse partitions. The lower ends of these spaces are open, but the upper ends thereof are adapted to be closed by a cover plate or lid L secured to arms N hingedly supported at points indicated at 16. The lower or inner side of the lid L is provided with ribs L' which are adapted to be embedded within the concrete in forming grooves in the upper edges of the block. The upper end of the jacket J is preferably provided with a flange as indicated at 17 to facilitate the wiping or scraping off of the upper end of the mold in forming the block, and to provide securing means for a latch 18 pivoted at 19 on the arms N and provided with a handle 20 by means of which the latch can be actuated.

Four plunger rods R are secured at their lower ends to the yoke Y which latter as shown in Fig. 4 is formed with ears 21 adapted to receive the ends of the rods. The yoke is also formed with openings 22 adjacent its opposite ends which receive guide rods G secured within the frames F and F' and so arranged as to permit vertical sliding movement of the yoke in effecting a vertical movement of the plunger rods R. As clearly shown in Fig. 2, the upper ends of the rods R are disposed adjacent the four corners of the block mold and at points between cores K and the jacket J. Cross bars 23 are secured to the upper ends of the rods and of such a width as to be freely movable between the cores and jacket. Within the block mold a plunger plate T is adapted to be arranged for spanning the spaces between the cores and the jacket, such plate being of the construction shown in Fig. 2 wherein it will be seen that its longitudinal edges are bent to form semi-circular grooves 24 at the upper side thereof, such grooves being designed to form at the lower edges of the block tongues which are adapted to co-operate with the grooves of an adjacent block for locking any two blocks against lateral displacement as will be understood.

As clearly shown in Fig. 2, metallic pads 28 are interposed between the plunger plate T and the bars 23 for the purpose of preventing any undue wear or distortion of the plunger plate to accurately form the bottom edge of the plastic block. Pulleys D and D' are fixed to the opposite ends of the shaft S journaled in bearings 25 arranged at the forward side of the mold. These pulleys D and D' are grooved and of semicircular form with operating arms A and A' secured to the pulleys for effecting rotation of the latter as will be understood. Cables C are secured to the pulleys and repose within the grooves thereof, with their lower ends secured to screw-threaded rods 26 extended through and screwed in the opposite ends of the yoke Y by means of nuts 27.

As shown in Fig. 1, cross bars 29 and 30 rigidly connect the frames F and F' and also serve as a supporting means for a plunger latch H. The latch H comprises in the present instance a latch bar 31 pivoted at the point indicated at 32 upon the bar 30 and provided with a notch 33 adapted to receive a lug 34 formed on the yoke Y for maintaining the plunger mechanism as a unit in elevated position. The latch bar 31 is operated by an arm 35 rigidly connected to the bar and provided at its free end with a head 36 upon which the foot of an operator is adapted to repose in effecting actuation of the latch. The arm 35 and consequently the latch bar 31 is urged to a latching position with respect to the lug 34 by means of a coil contractile spring 37 secured to the bar 29 at one end and to the arm 35 at the other.

The operation of the molding apparatus is as follows: With the plunger mechanism in depressed or normal position as shown in Fig. 2, cement or other plastic material is introduced into the mold so as to completely fill the spaces between the cores K and the jacket J. The plunger plate T is now elevated within the mold by an actuation of the pulleys D and D' thereby causing the cables C and C' to elevate the yoke Y and consequently the plunger rods R. When the yoke has reached the position shown in Fig. 6, the lug 34 engages within the notch 33 of the latch bar 31 thereby securing the yoke in its elevated position. With the plunger mechanism so elevated, the plunger plate occupies a corresponding position within the mold, and during its upward movement it effects a packing of the plastic material to the extent of the resistance offered by the weight of the material as well as the drag thereof due to its adhesion to the walls of the mold. As previously stated the cores are tapered from their lower ends to their upper ends, and this taper provides spaces between the jacket and cores which increase in width from the lower end of the mold to the upper end. When the spaces are filled with plastic material and the plunger plate P moved upwardly, the tapering of the spaces operates to cause a packing of the material at the widest parts of the spaces, which obviously assists in securing the necessary compactness of the material to form the block. The packing of the material thus obtained is sufficient to form a homogeneous mass which when set provides a block of durable and efficient construction.

The foregoing packing operation having been completed, that portion of the plastic material projecting above the upper end of the mold is wiped or scraped off flush with the mold, whereupon the cover L is moved to closed position and latched in the manner previously described. With the cover in closed position, a further elevation of the plunger plate T can now be effected to cause a firmer packing of the material; whereupon by first unlatching and opening the cover L the complete block with the plunger plate can be readily ejected by movement of the plunger mechanism to the dotted line position shown in Fig. 6. The block is laid aside to set, so that the apparatus is now ready for a second block molding operation.

Figure 7:
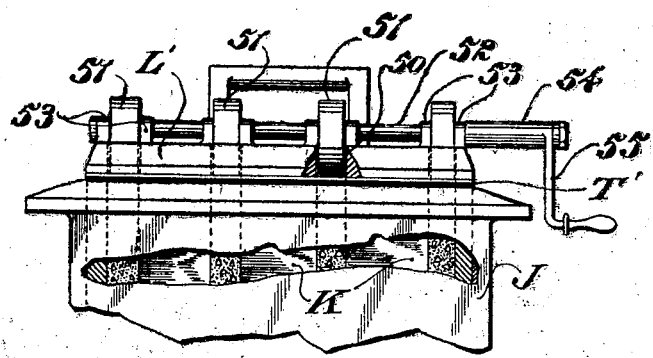
Fig. 7 is a fragmentary view partly in section showing a modified form of lid and compressing means embodying my invention.

Referring now to Fig. 7, I have here shown the mold provided with a lid L' formed at intervals with openings 50 in which cams 51 are adapted to work. The cams 51 are fixed to a shaft 52 journaled in bearings 53 sustained on the lid, with one end of the shaft projecting from the lid and provided with a sleeve 54 to which an operating crank 55 is secured. The cams 51 are adapted to engage a plunger plate T' mounted within the lid and of the same form as the plate T shown in Fig. 5 with the exception that its relation to the top of the mold is reversed for the purpose of providing grooves in the block instead of ribs.

As shown in Fig. 7, the cams are arranged at points corresponding to the spaces between the sections of the core K so that when the shaft 52 is rotated by the crank 55, the cams will force the plunger plate T' downwardly within the mold for a distance sufficient to effect a packing of the material within the mold.

Figure 8:
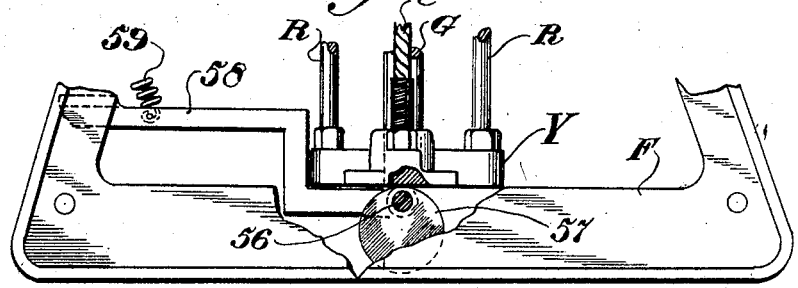
Fig. 8 is a fragmentary view partly in section showing another form of yoke elevating means embodying my invention.
Figure 9:
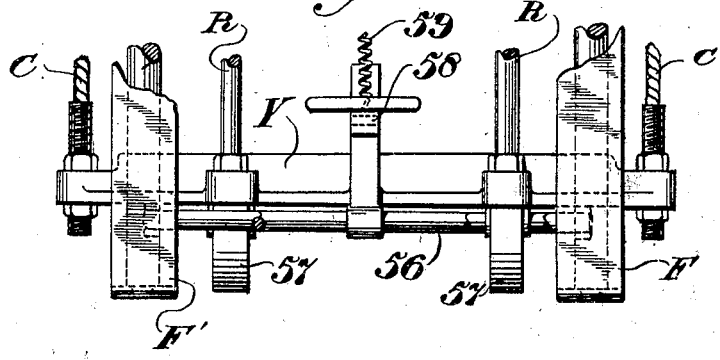
Fig. 9 is a fragmentary view showing in side elevation the elevating means shown in Fig. 8.

In Figs. 8 and 9, I have shown another means of elevating the yoke Y to lift the plunger plate T a distance corresponding substantially to the notch 33 so as to effect the initial compression of the material as has been described. This elevating means works in conjunction with the cams 51 and the plunger plate T so that a compression of the material is effected at both the top and bottom of the mold.

This elevating means comprises in the present instance a shaft 56 journaled in the frames F and F' and to which are fixed cams 57. An operating pedal 58 is fixed to the shaft 56 and normally held in elevated position by means of a spring 59 which latter may be connected to the rod 29. By depressing the pedal 58 the shaft 56 can be actuated to move the cams 57 in effecting an elevation of the yoke Y thereby causing the plunger plate T to move upwardly within the mold in effecting a compression of the material as has been described.

What we claim is:

1. A block molding apparatus comprising a mold including a jacket, cores positioned within the jacket to provide spaces between the jacket and cores, a plunger movable upwardly from the bottom of said mold for effecting a packing of the plastic material contained within the mold, means for operating said plunger, and latching means for securing the mechanism in a partly elevated position.

2. A block molding apparatus comprising a mold including a jacket, and cores positioned within the jacket, said cores being tapered from their lower ends to their upper ends to provide tapering spaces between the jacket and cores, a plunger movable upwardly from the bottom of said mold for effecting a packing of the plastic material contained within the mold, mechanism for operating said plunger, and latching means for securing the mechanism in a partly elevated position.

3. A block molding apparatus comprising a mold including a jacket and cores within the jacket, a plunger plate movable upwardly within the mold and between the cores and said jacket, a plurality of plunger rods below the plunger plate, bars connecting the rods at their upper ends, metallic pads between the plunger plate and bars, and means for simultaneously elevating all of said rods.

4. A block molding apparatus comprising a mold including a jacket and cores within the jacket, a plunger plate movable upwardly within the mold and between the cores and said jacket, a plurality of plunger rods below the plunger plate, bars connecting the rods at their upper ends, metallic pads between the plunger plate and bars, a yoke connected to the plunger rods, pulleys rotatably sustained adjacent the mold, and cables connecting the pulleys to said yoke for effecting elevation of the latter upon rotation of the pulleys.

5. A block molding apparatus comprising a mold including a jacket and cores within the jacket, a plunger plate movable upwardly within the mold and between the cores and said jacket, a plurality of plunger rods below the plunger plate, bars connecting the rods at their upper ends, metallic pads between the plunger plate and bars, a yoke connected to the plunger rods, pulleys rotatably sustained adjacent the mold, cables connecting the pulleys to said yoke for effecting elevation of the latter upon rotation of the pulleys, and means for latching the yoke in elevated position comprising a latch bar, a lug formed within the yoke and engageable with the latch bar, and means for moving the latch bar into or out of the path of movement of said lug.

6. A block molding apparatus comprising a mold including a jacket having upper and lower ends, cores sustained within the jacket, a plunger plate between the cores and jacket and arranged at the bottom thereof for upward sliding movement, grooves formed in the plunger plate, a cover plate swingingly supported upon the jacket to close the upper end of the mold, and tongues formed on said plate for the purpose described.

7. A block molding apparatus comprising a mold including a jacket, and a core within the jacket, a lid on said jacket, plunger plates vertically movable within the jacket and at the top and bottom thereof, means for moving the lower plunger upwardly within the mold, and means carried by said lid for moving the upper plunger downwardly within the mold, both of said plungers being movable between said jacket and said core.

8. A block molding apparatus comprising a mold including a jacket and cores within the jacket, a lid movably sustained upon the mold, a plunger movable within the mold and between the cores and jacket, and means carried by the lid for actuating the plunger.

9. A block molding apparatus comprising a mold including a jacket and cores within the jacket, a lid movably sustained upon the mold, a plunger movable within the mold and between the cores and jacket, and cam operated means carried by the lid for actuating the plunger.

10. A block molding apparatus comprising a mold including a jacket and cores within the jacket, said mold having one of its ends open, a closure member for the open end of the mold, a plunger movable within the mold and between the cores and jacket, and means sustained on the closure member for actuating the plunger from a point exteriorly of the mold.

11. A block molding apparatus comprising a mold including a jacket and cores within the jacket, said mold having one of its ends open, a closure member for the open end of the mold, a plunger movable within the mold and between the cores and jacket, and cams sustained on and extending through the closure member for engagement with the plunger to effect an actuation of the latter.

12. A block molding apparatus comprising a mold, a lid for the mold, a plunger movable within the mold, and means carried by the lid for actuating the plunger.

13. A block molding apparatus comprising a mold, a lid for the mold, a plunger movable within the mold, and means operable from a point exteriorly of the mold for actuating the plunger.

14. A block molding apparatus comprising a mold, a plunger movable upwardly within the mold, rods below the plunger, bars connecting the rods at their upper ends, pads between the plunger and bars, and means for simultaneously elevating all of said rods.

In testimony whereof we have signed our names to this specification.

ANSON F. LEWIS.
ARTHUR G. BALAAM.